United States Patent [19]

Smith

[11] Patent Number: 5,157,331

[45] Date of Patent: Oct. 20, 1992

[54] ENHANCED WIDE APERTURE GROOVE FOR ANTENNA OF DOWNHOLE RESISTIVITY TOOL

[75] Inventor: Terry D. Smith, Victoria, Tex.

[73] Assignee: Western Atlas International, Inc., Houston, Tex.

[21] Appl. No.: 771,698

[22] Filed: Oct. 4, 1991

[51] Int. Cl.[5] .................. G01V 3/30; E21B 49/00; H01Q 1/40

[52] U.S. Cl. ................... 324/338; 324/369; 343/873

[58] Field of Search ............... 324/338–344, 324/347, 356, 369; 175/40, 41, 50; 343/872, 873

[56] References Cited

U.S. PATENT DOCUMENTS

| | | | |
|---|---|---|---|
| 4,461,997 | 7/1984 | Ohmer | 324/338 |
| 4,785,247 | 11/1988 | Meador et al. | 324/338 |
| 4,940,943 | 7/1990 | Bartel et al. | 324/338 |

*Primary Examiner*—Gerard R. Strecker
*Attorney, Agent, or Firm*—Darryl M. Springs

[57] ABSTRACT

In an electromagnetic propagating antenna circumferential groove disposed in an MWD resistivity tool mandrel and normally sealed with an epoxy resin non-conducting material forming an annular ring disposed in each of the plurality of circumferential grooves through which the electromagnetic energy from the antenna coil will propagate from the mandrel, each of the circumferential grooves comprises a pair of sidewalls interconnected by an annular flat base portion, each of the sidewalls further having disposed therein a plurality of circumferentially-spaced and longitudinally-disposed slots of uniform size having an open end communicating with each of the sidewalls and a closed end terminating longitudinally spaced from each of the sidewalls for forming a "zipper slot" configuration to the plurality of circumferential grooves, wherein the surface area of all of the plurality of zipper slots is preselected for cooperating with the surface area of each of the circumferential grooves for increasing the surface area of the grooves for permitting greater electromagnetic wave propagation from each of the antenna coils. In addition, the zipper slot configuration of the plurality of circumferential grooves cooperates with the annular ring of non-conducting materials disposed therein for mechanically enhancing the bond between the material and the mandrel and preventing displacement of the annular ring with respect to the zipper slot circumferential groove during operation in the borehole.

3 Claims, 3 Drawing Sheets

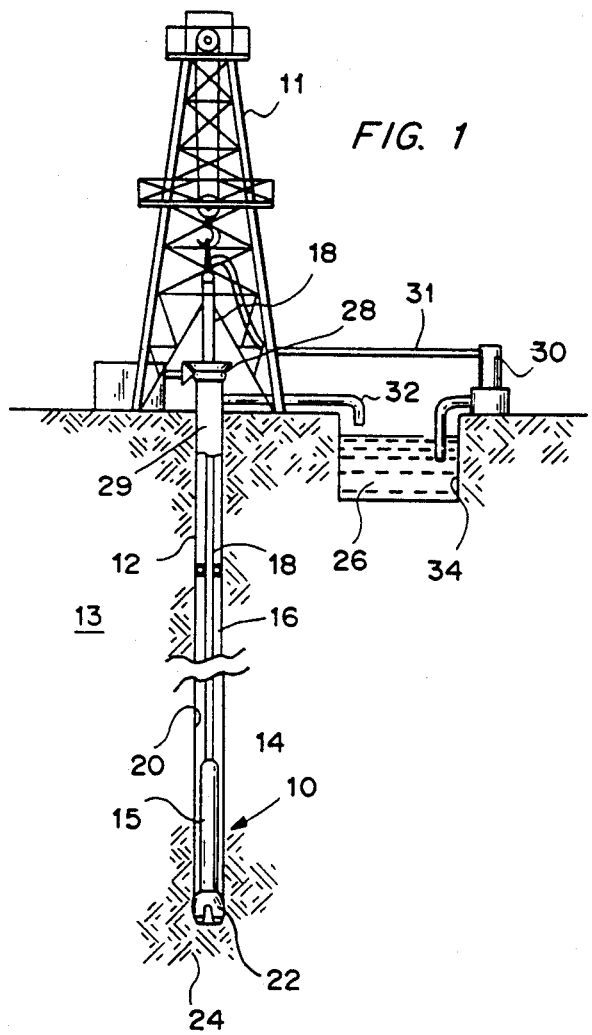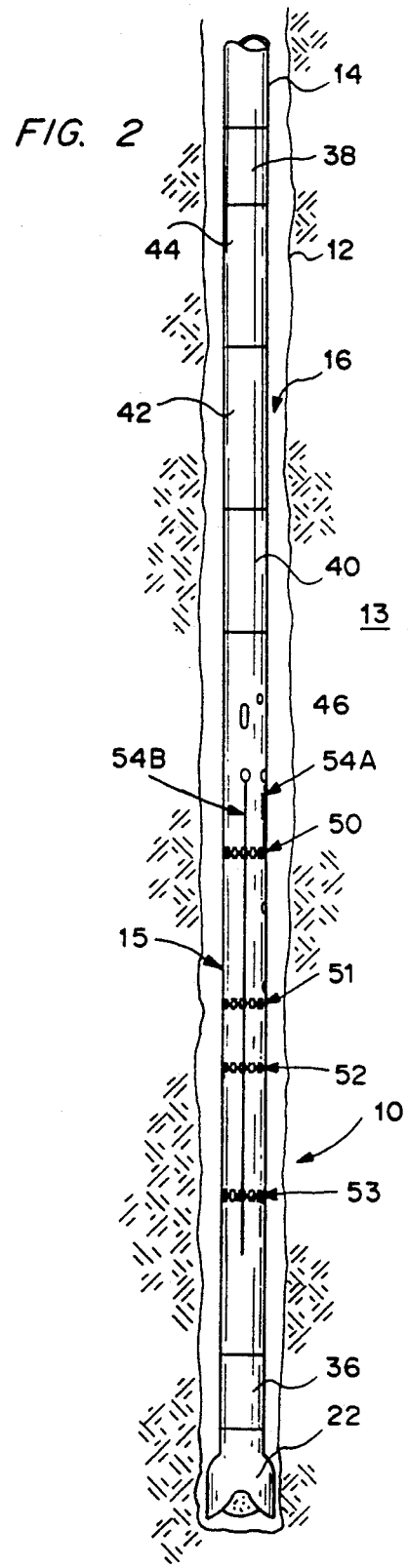

ENHANCED WIDE APERTURE GROOVE FOR ANTENNA OF DOWNHOLE RESISTIVITY TOOL

BACKGROUND OF THE INVENTION

This invention relates to formation resistivity measuring instruments and more specifically to improvements in the propagation properties of the antennas. A unique and improved design of the antenna radiating groove on the mandrel of resistivity tool is disclosed.

In measurement-while-drilling (MWD) operations, the resistivity measuring instrument is included in the drill string while the oil or gas borehole is being drilled. The resistivity sub usually has a plurality of electromagnetic coils spaced longitudinally of the tool mandrel. The antenna coils cannot be wound on the surface of the mandrel because of the hostile abrasive environment in the borehole during drilling in which the antenna coils would be damaged. The coils cannot be covered with an electrical conducting metal to act as an abrasion shield because such conducting material would also inhibit the electromagnetic propagation from the antenna into the formation. Accordingly, the electromagnetic radiating coils have been recessed in circumferential grooves in the tool mandrel and the grooves filled with a non-conducting and abrasion resistant material such as a selected epoxy resin.

However, the mechanical bond of the epoxy resin material often fails with respect to the antenna groove and the material is radially displaced outwardly from the groove which only hastens further abrasion and failure. In addition, while it is desired to maximize the surface area of the antenna slot to maximize the electromagnetic propagation from the antenna coil leaving the mandrel, increasing the width of the coil usually only magnifies the bonding failure and abrasion problems as above described.

Accordingly, one feature of the present invention is to provide an improved antenna groove design that will enhance the surface area of the groove for maximizing electromagnetic propagation while minimizing mechanical failure of the annular ring of non-conducting material with respect to the groove.

Another feature of the present invention is to provide an improved antenna groove configuration that will maximize the surface area for bonding between the non-conducting material and the groove sidewalls.

SUMMARY OF THE INVENTION

The present invention remedies the problems of the prior art by providing an improved design of a wide aperture groove for electromagnetic propagating antenna used on an MWD resistivity sub.

In accordance with one principle of the invention, in a downhole formation resistivity measuring instrument including an electromagnetic radiation propagating antenna which comprises an instrument housing forming an elongated cylindrical mandrel, a plurality of grooves circumferentially disposed in the outer surface of the mandrel and axially spaced apart thereon, a plurality of surface channels disposed longitudinally in the outer surface of the mandrel, one end of each of the channels terminating in one of the spaced-apart circumferential grooves and the other end of each of the channels communicating internally of the mandrel, a length of insulated wire disposed in each of the plurality of channels and wound circumferentially around the mandrel to form a coil disposed in each of the circumferential grooves for acting therein as an electromagnetic wave propagating antenna, and an epoxy resin non-conducting material having high abrasion resistance properties disposed in the plurality of circumferential grooves covering said antenna coils for forming an annular ring disposed in each of the plurality of circumferential grooves through which the electromagnetic wave energy from the antenna coils is propagated radially outwardly from the mandrel.

Further, each of the circumferential grooves also comprises a pair of sidewalls interconnected by an annular flat base portion, each of the sidewalls further having disposed therein a plurality of circumferentially-spaced and longitudinally-disposed slots of uniform size having an open end communicating with each of the sidewalls and a closed end terminating longitudinally spaced from each of the sidewalls for forming a "zipper slot" configuration to the plurality of circumferential grooves, and Wherein the surface area of all of the plurality of zipper slots is preselected for cooperating with the surface area of each of the circumferential grooves for increasing the surface area of the grooves for permitting greater electromagnetic wave propagation from each of the antenna coils. In addition, the zipper slot configuration of the plurality of circumferential grooves cooperates with the annular ring of non-conducting material disposed therein for mechanically enhancing the bond between the material and the mandrel and preventing displacement of the annular ring with respect to the zipper slot circumferential groove during operation in the borehole.

BRIEF DESCRIPTION OF THE DRAWINGS

In order that the manner in which the above-recited principles and features of the invention are attained can be understood in detail, a more particular description of the invention may be had by reference to specific embodiments thereof which are illustrated in the accompanying drawings, which drawings form a part of this specification.

In the drawings:

FIG. 1 is a schematic view of an oil or gas drilling rig and associated drill string and bit, including a formation resistivity instrument to measure formation resistivity while drilling the borehole.

FIG. 2 is a side view of the borehole shown in FIG. 1 in which the resistivity instrument disposed in the drill string is shown in greater detail.

DETAILED DESCRIPTION OF THE PREFERRED EMBODIMENT

Figure 3:
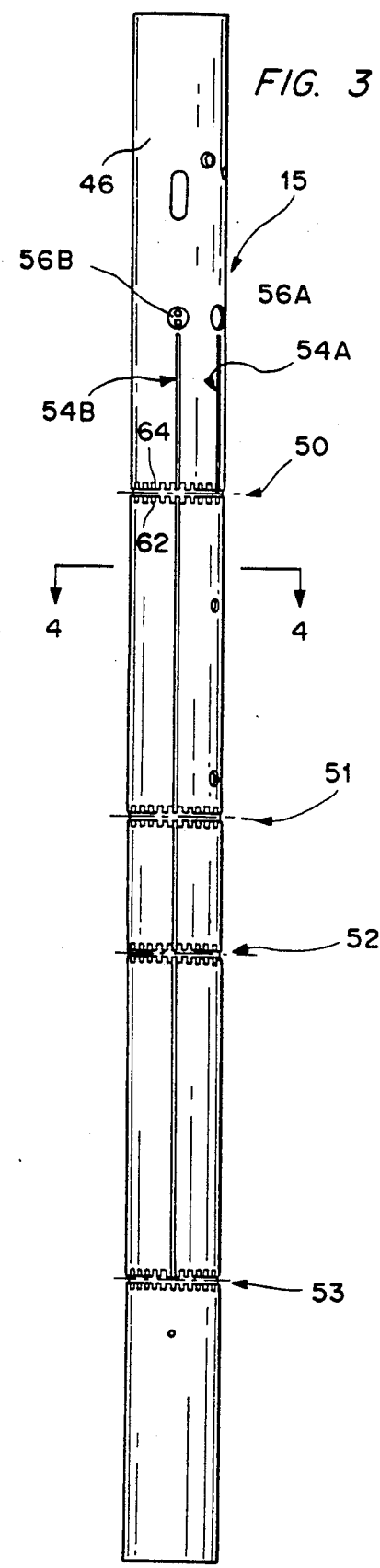
FIG. 3 is an enlarged side view of the resistivity tool showing the resistivity antenna circumferential grooves in the tool mandrel without the antenna coils and the non-conducting material normally filling the grooves.

Referring to FIG. 1, a drilling rig 11 is shown disposed on top of a borehole 12 disposed in earth formations 13. An instrument 10 for simultaneous formation resistivity logging is carried by a sub 15 comprising a portion of a drill collar 14 and is disposed within the borehole while the drilling operation is progressing.

A drill bit is disposed at the lower end of drill string 18 and carves the borehole 12 out of the lower earth formations 24 while drilling mud 26 is pumper from the wellhead 28. Metal surface casing 29 is shown positioned in the borehole 12 above the drill bit 22 for maintaining the integrity of the borehole 12 near the surface. The annulus 16 between the drill string 18 and the borehole wall 20 creates a theoretically closed return mud flow path. Mud is pumped from the wellhead 28 by a pumping system 30 through mud supply line 31 coupled to the drill string 18. Drilling mud is, in this manner, forced down the central axial passageway of the drill string 18 and exists at the drill bit 22 for carrying cuttings comprising the drilled sections of earth, rock and related matter upwardly from the drill bit to the surface. A conduit 32 is supplied at the wellhead for channeling the mud from the borehole 18 to a mud pit 34. The drilling mud is typically handled and treated at the surface by various apparatus (not shown) such as outgasing units and circulation tanks for maintaining a selected viscosity and consistency of the mud. The present formation resistivity logging system permits the measurement of formation resistivity in the regions surrounding the borehole during the pumping of drilling fluid through the drill string and borehole.

A shown in FIG. 1, the resistivity sub 15 and drill collar 14 comprise a portion of the formation logging system 10 of the present invention and the downhole environment. The system 10 is constructed to generate a series of signals for telemetry to the wellhead or a downhole recording system which signals are indicative of the formation matrix resistivity of the earth formations adjacent to the borehole. The requisite telemetry and analysis systems are deemed to be of conventional design and are not specifically described herein.

Referring now to FIG. 2, the logging system 10 is shown comprising the resistivity sub 15 which is connected at its lower end to the drill bit 22 by a crossover sub 36. Positioned above the sub 15 in the drill string are a downhole power sub 44, an electronics telemetry sub 42 and a signal processing sub 40. The system 10 is interconnected to the drill collars 14 by an upper crossover sub 38. The resistivity sub 15 comprises an elongated cylindrical housing or mandrel 46 carrying circumferentially disposed electromagnetic propagating antenna coils located in longitudinally spaced circumferential grooves 50, 51, 52 and 53. Longitudinally-disposed surface channels 54a and 54b (and 54c and 54d— not shown in this view) carry the wire for forming the antenna coils that are disposed in each of the circumferential grooves 50-53. Channel 54a terminates at groove 50 while channel 54b is shown communicating with groove 53. Corresponding channels 54c and 54d (not shown) are disposed on the reverse side of mandrel 46 and communicate with grooves 51 and 52. The other end of the wire channels 54a-54d communicate internally of mandrel 46 to provide communication between the antenna wire and the signal processing sub 40 and the telemetry sub 42.

FIG. 3 shows the resistivity sub 15, mandrel 46 wire channels 54a and 54b and the plurality of circumferential grooves 50-53 that receive the antenna coils for the resistivity instrument that propagate the electromagnetic field radially outwardly from the tool 15 into the formation 13. In FIG. 3, electrical access ports 56a and 56b are shown associated with the other end of wire channels 54a and 54b for permitting external test access to the antenna wire circuits from the outside of the tool. The circumferential antenna grooves 50-53 are each identical in construction, and therefore, any descriptions that follows will only describe a single groove but is equally applicable to all of the grooves 50-53. As shown in FIG. 3, the circumferential grooves 50-53 have associated therewith longitudinal slots 62 and 64 that communicate with the sidewalls of the grooves 50-53 and provide a "zipper slot" cross-sectional configuration, as will hereinafter be described in greater detail. As shown in FIG. 3, the grooves 50-53 do not have disposed therein the antenna coils or any protective insulating/sealing material (a will hereinafter be further described) in order to better show the groove/slot arrangement.

Figure 4:
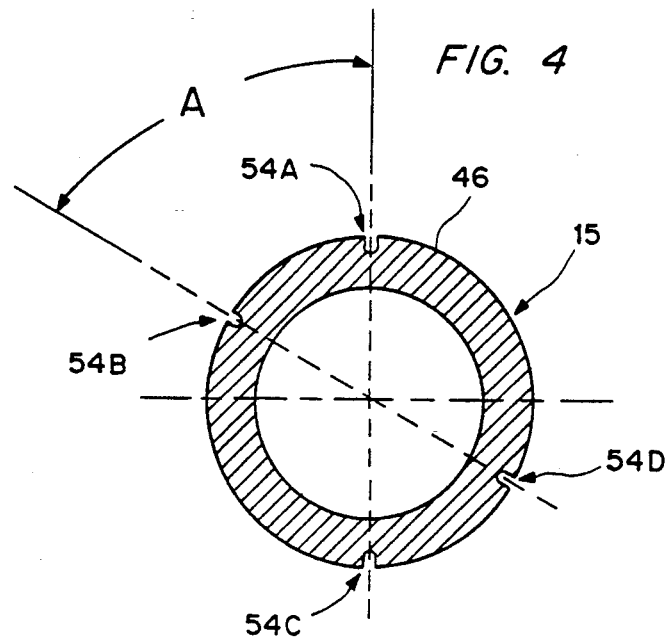
FIG. 4 is a horizontal cross-sectional view of the tool mandrel taken along lines 4—4 of FIG. 3.

FIG. 4 is a horizontal cross-sectional view, taken along lines 4—4 of FIG. 3, of the mandrel 46 of sub 15 and shows the circumferential distribution of the wire channels 54a, 54b, 54c and 54d. The angular circumferential spacing between the channels 54a and 54b is shown at A and may be any selected value. In the embodiment shown, it was found convenient for the angle A to be 60°.

Figure 5:
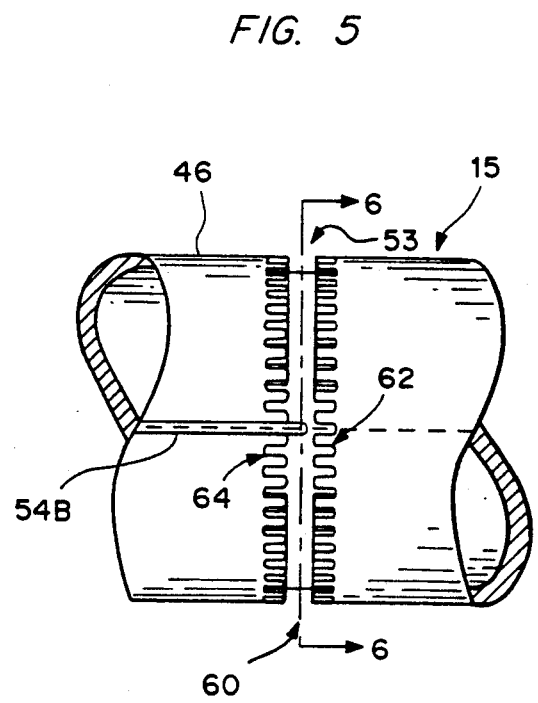
FIG. 5 is a fragmentary enlarged side view of one of the antenna coil circumferential grooves containing the zipper slots.
Figure 6:
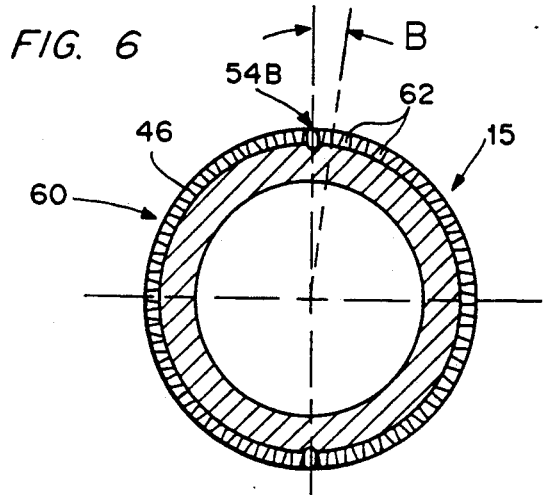
FIG. 6 is a horizontal cross-sectional view of the tool mandrel showing the zipper slots in the circumferential groove as taken along lines 6—6 of FIG. 5.

FIG. 5 shows an enlarged view of the lower antenna groove 53 disposed on mandrel 46 and communicating with wire channel 54b. The antenna groove 53 includes a circumferential groove 60 and a plurality of short slots 64 and 62, disposed above and below the groove 60, respectively, and are circumferentially-spaced and longitudinally-disposed with respect to the circumferential groove 60. One open end of slots 62 and 64 communicate with each sidewall of groove 60 (as will be hereinafter described in greater detail) and the other end is a closed end extending longitudinally from the groove. The spacing of the slots and the slot width and depth can be chosen depending on the diameter of the mandrel 46 and the additional area desired to be added to the groove 53 to enhance the electromagnetic propagation from the antenna coil disposed in the antenna grooves 50-53, as will be hereinafter further described. The slots 62 and 64 may have their open ends in opposing registration as shown or they may be offset. The longitudinal slots 62 and 64 communicating with the groove 60 present a "zipper slot" configuration to the antenna groove 53. In FIG. 6, the plurality of circumferentially-spaced slots 62 are shown in a horizontal cross-sectional view as taken along lines 6—6 of FIG. 5. The number of slots 62(64) are a matter of choice, but in the embodiment shown, the preferred number of slots was 48, having an angular spacing shown at B, which for 48 slots is 7.5°.

Figure 7:
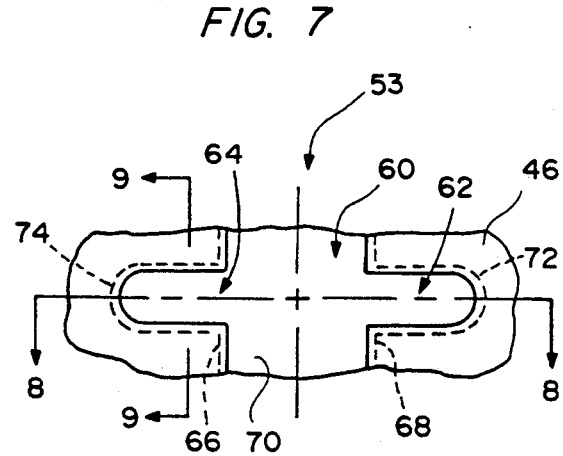
FIG. 7 is a fragmentary enlarged view of a portion of the antenna coil circumferential groove and a pair of associated zipper slots.
Figure 9:
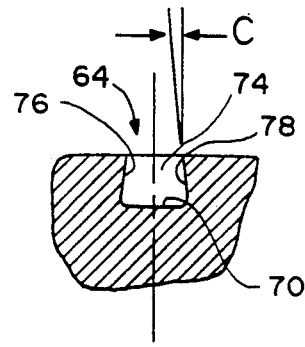
FIG. 9 is a fragmentary horizontal cross-sectional view of a zipper slot associated with the circumferential groove as taken along lines 9—9 of FIG. 7.
Figure 8:
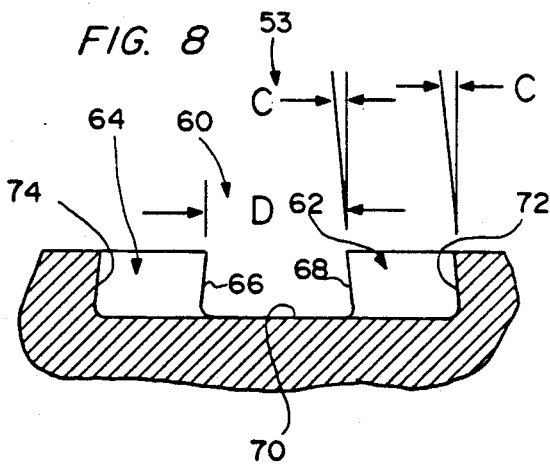
FIG. 8 is a fragmentary vertical cross-sectional view of the zipper slot circumferential groove as taken along lines 8—8 of FIG. 7.
Figure 10:
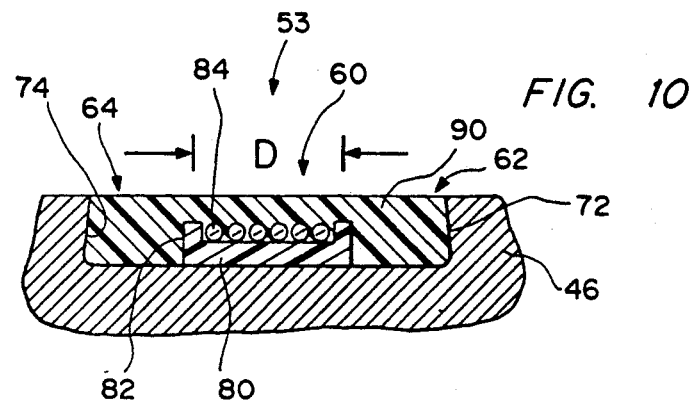
FIG. 10 is a fragmentary vertical cross-sectional view of the zipper slot circumferential groove of the resistivity tool showing the antenna coil disposed therein and an epoxy resin non-conducting material annular ring in said groove.

Referring now to FIGS. 7-9, details of the antenna groove 53, central groove 60 and cooperating slots 62 and 64 are shown. The circumferential groove 60 is centrally located in antenna groove 53 and has inwardly slanting (dovetail effect) sidewalls 66 and 68 and a flat base portion 70. The width of the groove 60 at the mandrel surface is shown by the width D, which may be preselected depending on the size of the mandrel 46 and the desired electromagnetic radiation to be propagated from the groove 53 by the antenna coil. The slant angle is shown at C and was chosen as 5°. Each of the groove sidewalls 66 and 68 have disposed therein slots 64 and 62, respectively. Each slot 62 and 64 has one open end communicating with a respective groove sidewall 66 and 68. The end walls 72 and 74 and the sidewalls 76 and 78 of the slots 62 and 64 ar also inwardly slanted to form a dovetail effect as shown, and also have a slant angle C that may be any convenient angle which will provide the mechanical locking properties to be further described.

Referring now to FIGS. 7-10, the circumferential antenna groove 53 is shown in use on the mandrel 46 with an antenna coil 84 disposed in the groove 60 and the remaining volume of the groove 60 and zipper slots 62 and 64 filled by an epoxy resin non-conducting material 90. A circular plastic spindle 80 having upstanding sides 82 is first disposed in groove 60 and rests on the base or floor portion 70 and acts to hold the coils 84 of the antenna wire that have been brought to groove 53 via channel 54b (see FIG. 5). The antenna coil 84 is wound on the spindle 80 with the sides 82 holding the wire coils together and preventing their spreading apart. Then the remaining volume of the groove 60 and the alternating zipper slots 62 and 64 are filled with the non-conducting material 90. The material 90 may be any suitable material that possesses the combination of non-conducting properties and abrasion resistance properties that will protect the antenna coil 84 disposed in the antenna groove 53. Various epoxy resin materials have been found to be suitable for this purpose.

In the design of a electromagnetic radiation propagating antenna for measuring formation resistivity, it is important to design the antenna groove 53 with sufficient surface area to propagate the maximum amount of energy into the formation from the antenna coil. If the antenna groove 53 is too wide the non-conducting material 90 often breaks loose from the sidewalls of the groove and the material is damaged and abraded during MWD operations. Such damage to the non-conducting material then leads to abrasion and damage to the antenna coils.

The unique design of the groove 60 and zipper slots 62 and 64 overcome this problem. The width and length of the zipper slots 62 and 64 add "effective" surface area to the non-conducting material 90 at the surface of mandrel 46 through which electromagnetic radiation from the antenna coil 84 can propagate. Accordingly, the "effective" width of the propagating antenna slot 53 can be increased without sacrificing mechanical structural integrity of the annular bond of non-conducting material. The zipper slot configuration of groove 60 and slots 62 and 64 also maximize surface area of the groove 60 and slots 62 and 64 for providing maximum bonding area between the groove 60, slots 62 and 64 and the epoxy resin non-conducting material 90 in order to maximize mechanical structural integrity of the annular bond of material 90. In addition, the inwardly slanting walls of the groove 60 and slots 62 and 64 form a "dovetail" effect that increases the "mechanical locking" effect and structural integrity of the annular bond of non-conducting material 90 to prevent loosening of the material 90 with respect to the sidewalls of the groove 60 and slots 62 and 64 and prevent radial separation of the material 90 with respect to the groove 60 and slots 62 and 64.

Numerous variations and modifications may be made in the structure herein described without departing from the present invention. Accordingly, it should be clearly understood that the forms of the invention herein described and shown in the figures of the accompanying drawings are illustrative only and are not intended to limit the scope of the invention.

I claim:

1. In a downhole formation resistivity measuring instrument including an electromagnetic radiation propagating antenna which comprises:

an instrument housing forming an elongated cylindrical mandrel, a plurality of grooves circumferentially disposed in the outer surface of said mandrel and axially spaced apart thereon, a plurality of surface channels disposed longitudinally in the outer surface of said mandrel, one end of each of said channels terminating in one of said spaced apart circumferential grooves and the other end of each of said channels communicating internally of said mandrel, a length of insulated wire disposed in each of said plurality of channels and wound circumferentially around said mandrel to form a coil disposed in each of said circumferential grooves for acting therein as an electromagnetic wave propagating antenna, and an epoxy resin non-conducting material having high abrasion resistance properties disposed in said plurality of circumferential grooves covering said antenna coils for forming an annular ring disposed in each of said plurality of circumferential grooves through which the electromagnetic wave energy from said antenna coils is propagated radially outwardly from said mandrel, wherein each of said circumferential grooves further comprises a pair of sidewalls interconnected by an annular flat base portion, each of said sidewalls further having disposed therein a plurality of circumferentially-spaced and longitudinally-disposed short slots of uniform size having an open end communicating with each of said sidewalls and a closed end terminating longitudinally spaced from each of said sidewalls for forming a "zipper slot" configuration to said plurality of circumferential grooves, and wherein the mandrel area of all of said plurality of zipper slots is preselected for cooperating with the surface area of each of said circumferential grooves for increasing the surface area of said circumferential grooves for permitting greater electromagnetic wave propagation from each of said antenna coils, and wherein said zipper slot configuration of said plurality of circumferential grooves cooperates with said annular ring of non-conducting material disposed therein for mechanically enhancing the bond between said material and said mandrel and preventing displacement of said annular ring with respect to said zipper slot circumferential groove during operation in the borehole.

2. The apparatus as described in claim 1, wherein each of said circumferential grooves has a dovetail cross-sectional configuration for cooperating with said annular ring of non-conducting material for adding increased mechanical integrity therebetween and minimizing radial displacement of the annular ring with respect to said groove.

3. The apparatus as described in claim 3 wherein each of said zipper slots communicating with said circumferential groove has a dovetail cross-sectional configuration cooperating with said annular ring of non-conducting material for adding increased mechanical integrity therebetween and minimizing radial displacement of the annular ring with respect to said slots.

* * * * *